(12) United States Patent
Lee et al.

(10) Patent No.: US 10,013,195 B2
(45) Date of Patent: Jul. 3, 2018

(54) MEMORY MODULE INCLUDING PLURALITY OF MEMORY PACKAGES WITH REDUCED POWER CONSUMPTION

(71) Applicant: SK hynix Inc., Icheon-si, Gyeonggi-do (KR)

(72) Inventors: Do Yun Lee, Yongin-si Gyeonggi-do (KR); Min Chang Kim, Seoul (KR); Chang Hyun Kim, Seoul (KR); Jae Jin Lee, Gwangju-si Gyeonggi-do (KR); Hun Sam Jung, Icheon-si Gyeonggi-do (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 0 days.

(21) Appl. No.: 15/162,748

(22) Filed: May 24, 2016

(65) Prior Publication Data

US 2017/0199691 A1    Jul. 13, 2017

(30) Foreign Application Priority Data

Jan. 7, 2016   (KR) .................. 10-2016-0002001

(51) Int. Cl.
*G11C 5/02*      (2006.01)
*G06F 3/06*      (2006.01)
*G06F 13/28*     (2006.01)

(52) U.S. Cl.
CPC .......... *G06F 3/0625* (2013.01); *G06F 3/0604* (2013.01); *G06F 3/0689* (2013.01); *G06F 13/287* (2013.01)

(58) Field of Classification Search
None
See application file for complete search history.

(56) References Cited

U.S. PATENT DOCUMENTS

| | | | |
|---|---|---|---|
| 5,479,624 A * | 12/1995 | Lee | G06F 12/0607 711/1 |
| 2004/0257846 A1 | 12/2004 | Lee et al. | |
| 2006/0233012 A1* | 10/2006 | Sekiguchi | G11C 5/02 365/51 |
| 2007/0058410 A1* | 3/2007 | Rajan | G11C 5/02 365/63 |
| 2012/0314477 A1* | 12/2012 | Siau | G11C 8/08 365/148 |
| 2014/0040568 A1 | 2/2014 | Lee et al. | |
| 2014/0185352 A1* | 7/2014 | Chow | G11C 5/025 365/63 |

FOREIGN PATENT DOCUMENTS

KR    1020040110507 A    12/2004

\* cited by examiner

*Primary Examiner* — Son Dinh
*Assistant Examiner* — Sultana Begum
(74) *Attorney, Agent, or Firm* — William Park & Associates Ltd.

(57) ABSTRACT

A memory module may include a plurality of memory groups configured to include a plurality of memory packages, respectively, and input/output data through input/output pins. The memory module may include a control circuit configured to activate one or more of the plurality of memory groups on a basis of an address signal. The memory module may include a multiplexer circuit configured to couple the memory group activated on the basis of the address signal to input/output buses of the memory module.

20 Claims, 6 Drawing Sheets

MEMORY MODULE INCLUDING PLURALITY OF MEMORY PACKAGES WITH REDUCED POWER CONSUMPTION

CROSS-REFERENCES TO RELATED APPLICATION

The present application claims priority under 35 U.S.C. § 119(a) to Korean application number 10-2016-0002001, filed on Jan. 7, 2016, in the Korean Intellectual Property Office, which is incorporated herein by reference in its entirety.

BACKGROUND

1. Technical Field

Various embodiments may generally relate to a memory module and a memory module including a memory package.

2. Related Art

A memory module may include a plurality of memory packages, wherein the memory packages may include various memory circuits. In order to satisfy the demands for an electronic apparatus to have a smaller size, a scheme has been discussed. The discussed scheme includes improving the degree of integration of a memory module and reducing the power consumed for the operation of the memory module. In order to reduce the power consumed by the memory module, it is necessary to reduce the power consumed in various elements constituting the memory module.

SUMMARY

In an embodiment, a memory module may be provided. The memory module may include a plurality of memory groups configured to include a plurality of memory packages, respectively, and input/output data through input/output pins. The memory module may include a control circuit configured to activate one or more of the plurality of memory groups on a basis of an address signal. The memory module may include a multiplexer circuit configured to couple the memory group activated on the basis of the address signal to input/output buses of the memory module.

In an embodiment, a memory module may be provided. The memory module may include a plurality of memory groups configured to include a plurality of memory packages, respectively, and input/output data through input/output pins. The memory module may include a multiplexer circuit configured to couple the memory group activated on the basis of an address signal to input/output buses of the memory module. The burst lengths associated with each memory group may be substantially equal to each other.

In an embodiment, a memory module may be provided. The memory module may include a first memory group configured to include a plurality of memory packages, and input/output data through input/output pins. The memory module may include a second memory group configured to include a plurality of memory packages, and input/output data through input/output pins. The memory module may include a third memory group configured to include a plurality of memory packages, and input/output data through input/output pins. The memory module may include a fourth memory group configured to include a plurality of memory packages, and input/output data through input/output pins. The memory module may include a control circuit configured to activate one or more of the first, second, third, and fourth memory groups on a basis of an address signal. The memory module may include a first multiplexer circuit configured to couple the first and second memory groups activated on the basis of the address signal to input/output buses of the memory module. The memory module may include a second multiplexer circuit configured to couple the third and fourth memory groups activated on the basis of the address signal to input/output buses of the memory module.

DETAILED DESCRIPTION

Various embodiments may provide a memory module including a memory package, which may minimize current consumption by reducing loading in a process in which a plurality of single wafers input/output data.

Various embodiments may provide a memory module capable of selectively increasing/decreasing an operation current by individually controlling activation or deactivation of a plurality of memory packages.

According to various embodiments, in memory packages included in a memory module, interconnections between input/output pins and single wafers may be minimized, so that loading when viewed from the input/output pins can be reduced. As the loading when viewed from the input/output pins is reduced, the reliability of data input/output of the memory package, a data input/output speed and the like may be improved and power required for data input/output may also be reduced.

According to various embodiments, only some of memory packages constituting a memory module may be activated, so that power consumption can be controlled in consideration of power consumption occurring in one memory package and thus efficient power management may be possible.

Hereinafter, a memory module will be described below with reference to the accompanying drawings through various examples of embodiments.

Figure 1:
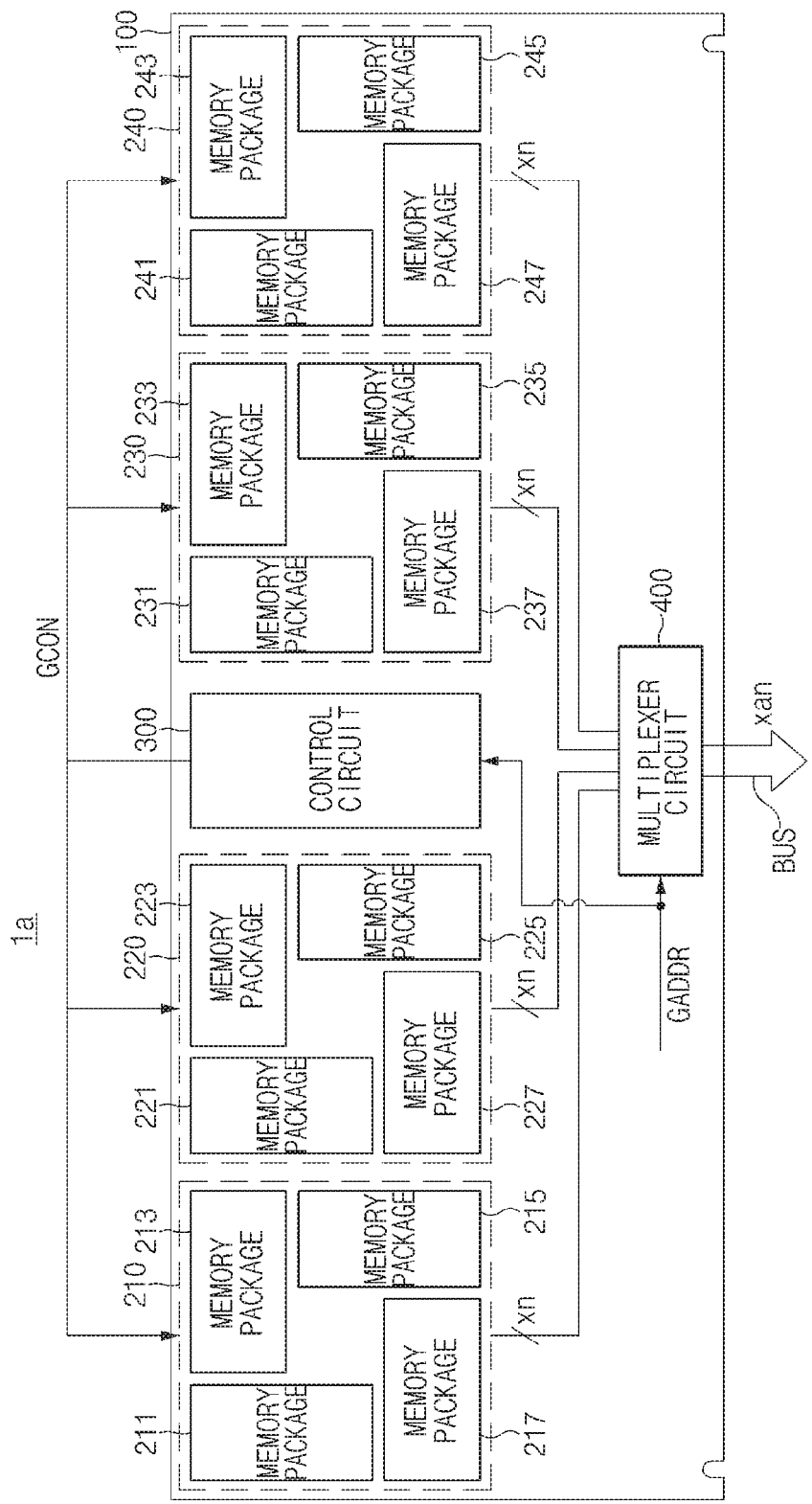
FIG. 1 to FIG. 3 are diagrams illustrating representations of examples of memory modules according to an embodiment.

FIG. 1 is a diagram illustrating a representation of an example of a memory module according to an embodiment.

Referring to FIG. 1, a memory module 1a may include a substrate 100, a plurality of memory groups 210, 220, 230, and 240 each including a plurality of memory packages 211 to 217, 221 to 227, 231 to 237, and 241 to 247, a control circuit 300, and a multiplexer circuit 400.

The plurality of memory packages 211 to 217, 221 to 227, 231 to 237, and 241 to 247 may be mounted on substantially the same plane on the substrate 100, wherein each of the plurality of memory packages 211 to 217, 221 to 227, 231 to 237, and 241 to 247 may have a configuration to be described with reference to FIG. 4 and FIG. 5.

In an embodiment, the plurality of memory groups 210, 220, 230, and 240 included in the memory module 1a may include substantially the same number of memory packages, respectively. In this case, when the memory groups 210, 220, 230, and 240 are activated, data bit numbers inputted/outputted for predetermined time intervals may be substantially equal to each other. That is, it can be understood that burst lengths are substantially equal to each other, and thus the memory groups 210, 220, 230, and 240 may include substantially the same number of input/output pins.

In an embodiment, the plurality of memory groups 210, 220, 230, and 240 included in the memory module 1a may include different numbers of memory packages, respectively. Accordingly, when the memory groups 210, 220, 230, and 240 are respectively activated, data with different burst lengths may be inputted/outputted. In an embodiment, even though the memory groups 210, 220, 230, and 240 include substantially the same number of memory packages, when burst lengths of the memory packages are different from one another and the memory groups 210, 220, 230, and 240 are activated, data with different burst lengths may be inputted/outputted. In this case, the number of input/output pins provided to the memory groups 210, 220, 230, and 240 may differ.

The control circuit 300 generates a control signal GCON on the basis of an address signal GADDR, thereby activating one or more of the plurality of memory groups 210, 220, 230, and 240. Data input/output may be performed only for a memory group activated on the basis of the address signal GADDR.

The multiplexer circuit 400 may couple input/output data, which has been received from the memory group activated on the basis of the address signal GADDR, to input/output buses BUS of the memory module 1a.

The input/output bus BUS of the memory module 1a may input/output data corresponding to a multiple of the burst length of the activated memory group. For example, when each of the memory groups 210, 220, 230, and 240 has a burst length of n and inputs/outputs data, the input/output buses BUS of the memory module 1a may have a burst length corresponding to a (a is a natural number equal to or more than 1) and input/output data.

The control circuit 300 may control the activation of memory groups on the basis of the address signal GADDR such that the number of the input/output buses BUS of the memory module 1a is substantially equal to the number of activated memory groups.

According to an embodiment, the number of the input/output buses BUS of the memory module 1a is 64, the memory module 1a may perform an input/output operation with a burst length of ×64, and the memory packages 211 to 217, 221 to 227, 231 to 237, and 241 to 247 of the memory groups 210, 220, 230, and 240 may perform an input/output operation with a burst length of ×8. In this case, the control circuit 300 may generate the control signal GCON such that 8 memory packages are activated and provide the control signal GCON to each of the memory groups 210, 220, 230, and 240. The control circuit 300 may generate the control signal GCON that activates two of the memory groups 210, 220, 230, and 240.

In an embodiment, similarly, the memory module 1a may perform an input/output operation with a burst length of ×64, and each of the memory packages 211 to 217, 221 to 227, 231 to 237, and 241 to 247 of the memory groups may perform an input/output operation with a burst length of ×16. In this case, the control circuit 300 may generate the control signal GCON such that 4 memory packages are activated and provide the control signal GCON to each of the memory groups 210, 220, 230, and 240. On the basis of the control signal GCON, one of the memory groups 210, 220, 230, and 240 may be activated.

The multiplexer circuit 400 may couple a memory group (one of 210, 220, 230, and 240) activated on the basis of the address signal GADDR to the input/output buses BUS of the memory module 1a. In the case of a data output operation, data outputted from an activated memory group (one of 210, 220, 230, and 240) may be outputted to the input/output buses BUS of the memory module 1a via the multiplexer circuit 400. In the case of a data input operation, data provided to the input/output buses BUS of the memory module 1a may be provided to an activated memory group of the memory groups 210, 220, 230, and 240 via the multiplexer circuit 400. The activation of the memory groups 210, 220, 230, and 240 may be performed according to the control signal GCON generated in the control circuit 300 on the basis of the address signal GADDR.

For example, the memory groups 210, 220, 230, and 240 and the multiplexer circuit 400 may be coupled to each other through interconnections formed in the substrate 100.

In the memory module 1a according to an embodiment, only some selected from all the memory groups 210, 220, 230, and 240 mounted in the memory module 1a according to the address signal GADDR may be activated. Only some memory groups activated among the entire memory groups 210, 220, 230, and 240 of the memory module 1a operate, so that power consumption in the memory module 1a may be reduced. For example, when a low power operation is performed, only minimum memory groups may be activated, and if there is a margin in power, many memory groups may be activated.

FIG. 1 illustrates that the memory module 1a has a form of a UDIMM (Unbuffered Dual In-line Memory Module); however, an embodiment is not limited thereto and the memory module 1a according to an embodiment may be implemented in various forms such as a RDIMM (Registered DIMM), a LRDIMM (Load Reduced DIMM), and a SODIMM (Small Outline DIMM).

Figure 2:
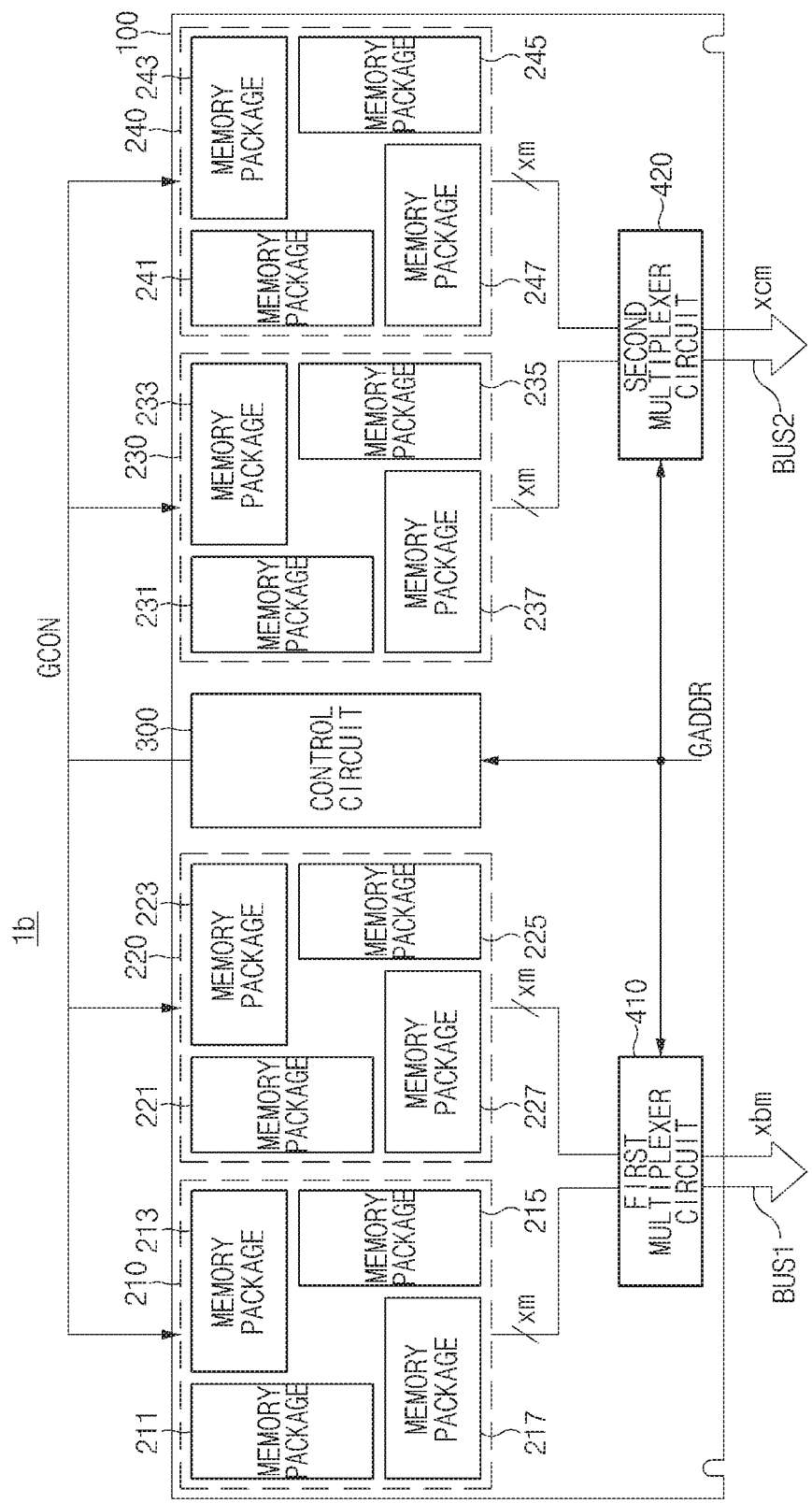

FIG. 2 is a diagram illustrating a representation of an example of a memory module according to an embodiment.

Referring to FIG. 2, a memory module 1b may include a substrate 100, a plurality of memory groups 210, 220, 230, and 240, a control circuit 300, and a plurality of multiplexer circuits 410 and 420. In FIG. 2, the same reference numerals are used to designate the same elements as those of FIG. 1, and since the same elements have substantially the same configurations and perform substantially the same operations, a description thereof will be omitted.

As compared with the memory module 1a of FIG. 1, in the memory module 1b of FIG. 2, the memory groups 210, 220, 230, and 240 are coupled to input/output buses BUS1 and BUS2 through the plurality of multiplexer circuits 410 and 420, so that it is possible to reduce the lengths of interconnections between the memory groups 210, 220, 230, and 240 and the multiplexer circuits 410 and 420.

The first multiplexer circuit 410 may couple the first and second memory groups 210 and 220 to the first input/output bus BUS1 of the memory module 1b, and the second multiplexer circuit 420 may couple the third and fourth memory groups 230 and 240 to the second input/output bus BUS2 of the memory module 1b.

For example, in the memory module 1a of FIG. 1, since all the memory groups 210, 220, 230, and 240 are coupled to one multiplexer circuit 400, there is a difference in the lengths of the interconnections between the memory groups 210, 220, 230, and 240 and the multiplexer circuit 400. For example, when the case in which the first memory group 210 is activated and performs an input/output operation with the multiplexer circuit 400 is compared with the case in which the second memory group 220 is activated and performs an input/output operation with the multiplexer circuit 400, a delay time may be shortened when the second memory group 220 performs the input/output operation with the multiplexer circuit 400.

In the memory module 1b of FIG. 2, the first memory group 210 and the second memory group 220 coupled to the first multiplexer circuit 410 may be coupled to each other through interconnections having substantially the same length. Similarly, the third memory group 230 and the fourth memory group 240 coupled to the second multiplexer circuit 420 may be coupled to each other through interconnections having substantially the same length.

The first multiplexer circuit 410 may selectively couple the first and second memory groups 210 and 220 to the first input/output bus BUS1 on the basis of an address signal GADDR. The second multiplexer circuit 420 may selectively couple the third and fourth memory groups 230 and 240 to the second input/output bus BUS2 on the basis of the address signal GADDR.

Each of the memory groups 210, 220, 230, and 240 may perform the input/output operation with substantially the same length requiring substantially the same number of input/output pins. For example, in FIG. 2, each of the memory groups 210, 220, 230, and 240 performs the input/output operation with a burst length of m. the first input/output bus BUS1 outputted through the first multiplexer circuit 410 may have a burst length of bm (b is an integer larger than 0), and the second input/output bus BUS2 outputted from the second multiplexer circuit 420 may have a burst length of cm (c is an integer larger than 0).

For example, when the memory module 1b operates with a burst length of ×32, each of the first input/output bus BUS1 and the second input/output bus BUS2 may have a burst length of ×16. When each memory group operates with a burst length of ×4, one of the first and second memory groups 210 and 220 may be activated and one of the third and fourth memory groups 230 and 240 may be activated. In an embodiment, when each of the first input/output bus BUS1 and the second input/output bus BUS2 may have a burst length of ×32, two of the first to fourth memory groups 210, 220, 230, and 240 may be activated, so that all the third and fourth memory groups 230 and 240 may be activated and all the first and second memory groups 210 and 220 may be deactivated.

Figure 3:
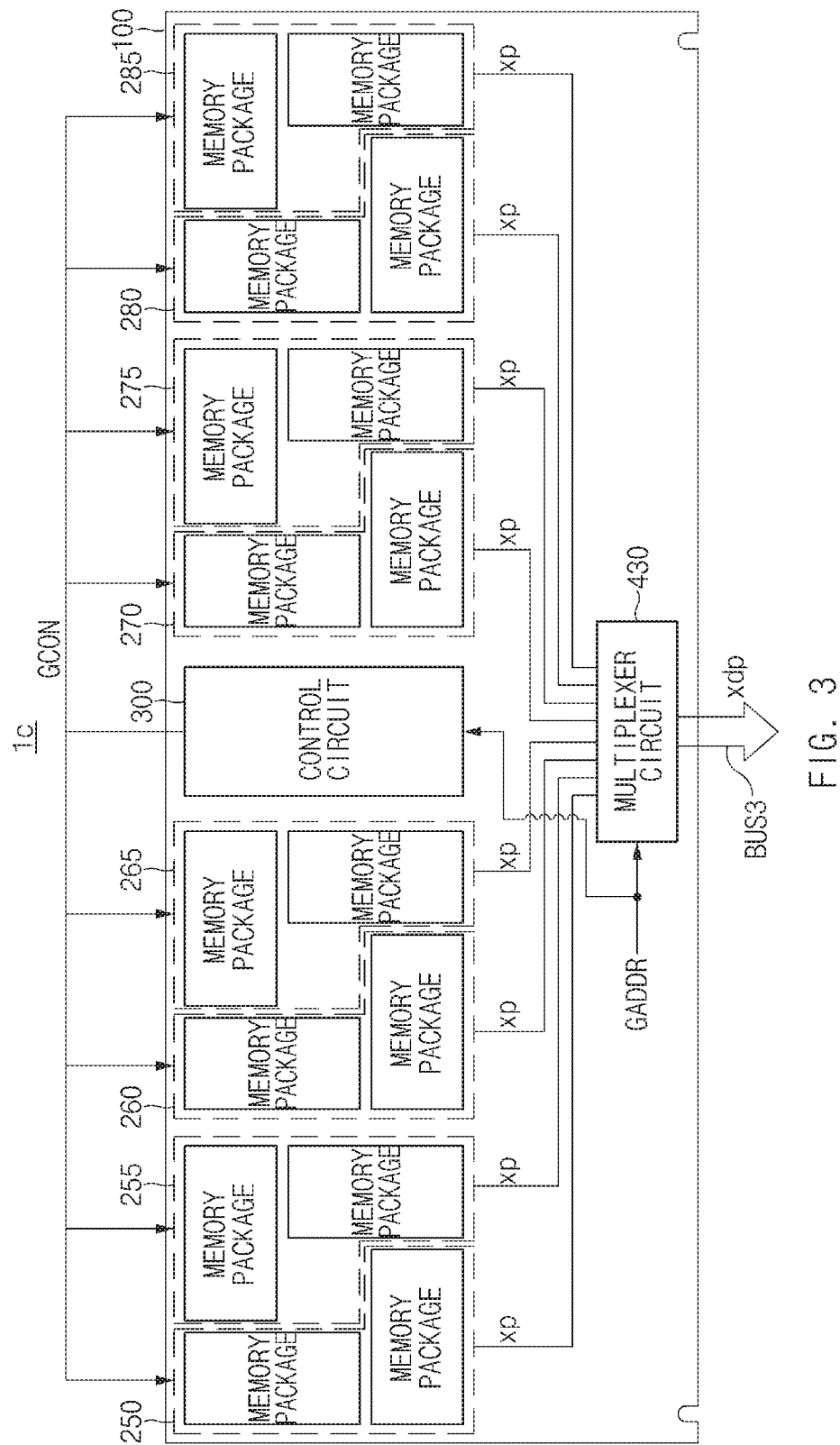

FIG. 3 is a diagram illustrating a representation of an example of a memory module according to an embodiment.

Referring to FIG. 3, a memory module 1c may include a substrate 100, a plurality of memory groups 250, 255, 260, 265, 270, 275, 280, and 285, a control circuit 300, and a multiplexer circuit 430.

The memory module 1c of FIG. 3 includes memory groups 250, 255, 260, 265, 270, 275, 280, and 285 each having two memory packages. The memory module 1c of FIG. 3 has substantially the same configuration as that of the memory module 1a of FIG. 1 except that each memory group has two memory packages.

The memory module 1c of FIG. 3 is illustrated in order to describe, for example, the fact that the memory modules 1a to 1c according to the embodiments may control an input/output operation in units of memory groups including various numbers of memory packages, and may also include two or more multiplexer circuits as with the memory module 1b of FIG. 2.

In the memory module 1c, one or more of the plurality of memory groups 250, 255, 260, 265, 270, 275, 280, and 285 may be activated on the basis of the address signal GADDR and data may be transmitted/received to/from the multiplexer circuit 430 through interconnections extending from the activated memory groups. Each of the memory groups 250, 255, 260, 265, 270, 275, 280, and 285 may perform an input/output operation with a burst length of ×p. The multiplexer circuit 430 may output data, which has been provided from the memory groups activated on the basis of the address signal GADDR, through a third bus BUS3, or may transmit data inputted through the third bus BUS3 to one or more of the plurality of memory groups 250, 255, 260, 265, 270, 275, 280, and 285 on the basis of the address signal GADDR.

Figure 4:
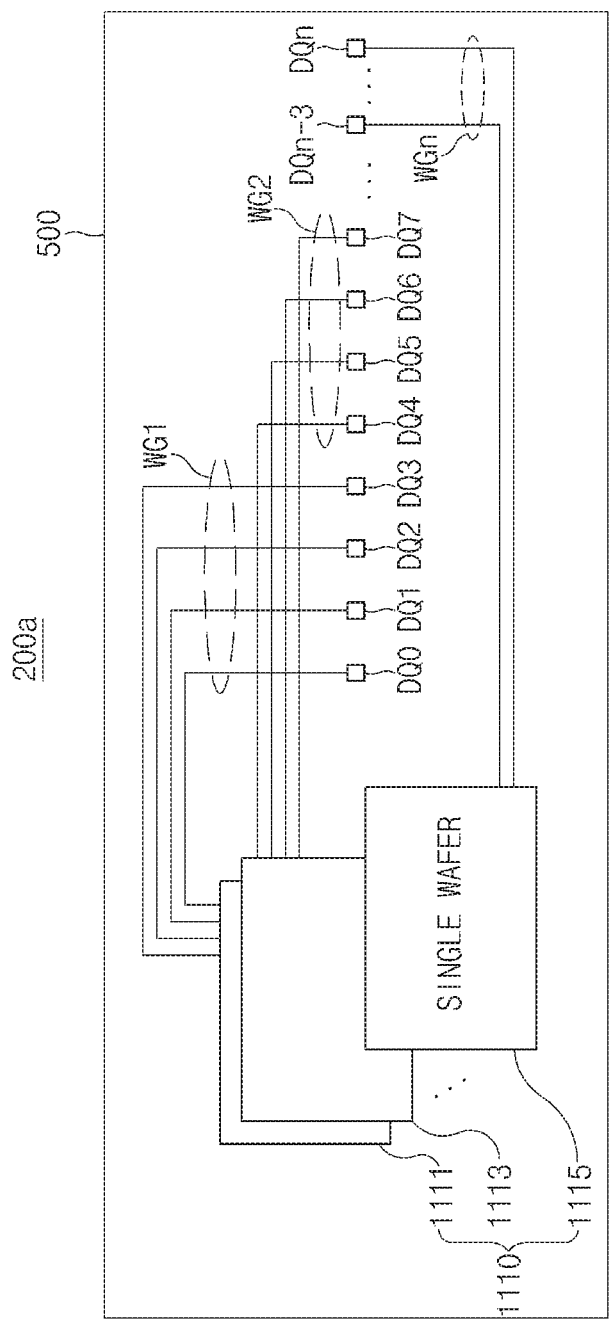
FIG. 4 and FIG. 5 are diagrams illustrating a representation of an example of a memory package included in a memory module according to an embodiment.

FIG. 4 is a diagram illustrating a representation of an example of a memory package included in the memory module according to an embodiment.

Referring to FIG. 4, a memory package 200a may include a plurality of single wafers 1110, a plurality of input/output pins DQ0 to DQn, and a plurality of wire groups WG1 to WGn that couple the plurality of single wafers 1110 to the plurality of input/output pins DQ0 to DQn.

Each of the single wafers 1111, 1113, and 1115 may perform an input/output operation with a first burst length (for example, ×4). Accordingly, four input/output terminals of each of the single wafers 1111, 1113, and 1115 may be coupled to four input/output pins.

FIG. 4 illustrates that the first single wafer 1111 is coupled to the first to fourth input/output pins DQ0 to DQ3 through the first wire group WG1 and the second single wafer 1113 is coupled to the fifth to eighth input/output pins DQ4 to DQ7 through the second wire group WG2. Each of the single wafers 1111, 1113, and 1115 may be coupled to substantially the same number of input/output pins through wires, so that all the input/output pins DQ0 to DQn provided to the memory package 200a may be finally coupled to the single wafers 1110 in a one-to-one manner.

For example, it is assumed that the single wafer 1110 performs an input/output operation of ×4 and 16 single wafers 1110 are included in the memory package 200a in FIG. 4. The 16 single wafers 1110 may be coupled to all 64 input/output pins and the memory package 200a may perform an input/output operation of ×64.

The memory package 200a included in the memory module according to an embodiment has a configuration in which the input/output pins DQ0 to DQn are coupled to the single wafers in a one-to-one manner, so that loading when viewed from the input/output pins DQ0 to DQn can be minimized.

In an embodiment, when the memory package 200a performs a ×64 operation, the number of the input/output pins DQ0 to DQn provided to the memory package 200a may be set to 64. However, when 8 single wafers 1110 performing an ×16 operation are provided, since each signal wafer 1110 should be coupled to 8 input/output pins, the input/output pins DQ0 to DQn provided to the memory package 200a may be coupled to the signal wafers 1110 in a 2:1 manner instead of a one-to-one manner.

As described above, when the signal wafers 1110 and the input/output pins DQ0 to DQn are coupled to each other in a one-to-multiple manner instead of a one-to-one manner, loading when viewed from the input/output pins DQ0 to DQn may increase. When the loading when viewed from the input/output pins DQ0 to DQn increases, it is probable that current consumption increases in a process of performing an input/output operation and an input/output signal is not transferred with reliability.

Accordingly, the memory package 200a according to an embodiment includes the signal wafers 1110 coupled to the input/output pins DQ0 to DQn in a one-to-one manner, so that loading when viewed from the input/output pins DQ0 to DQn can be minimized and thus power consumption may be reduced.

According to an embodiment, the plurality of single wafers 1110 may be sequentially stacked on a substrate 500.

Figure 5:
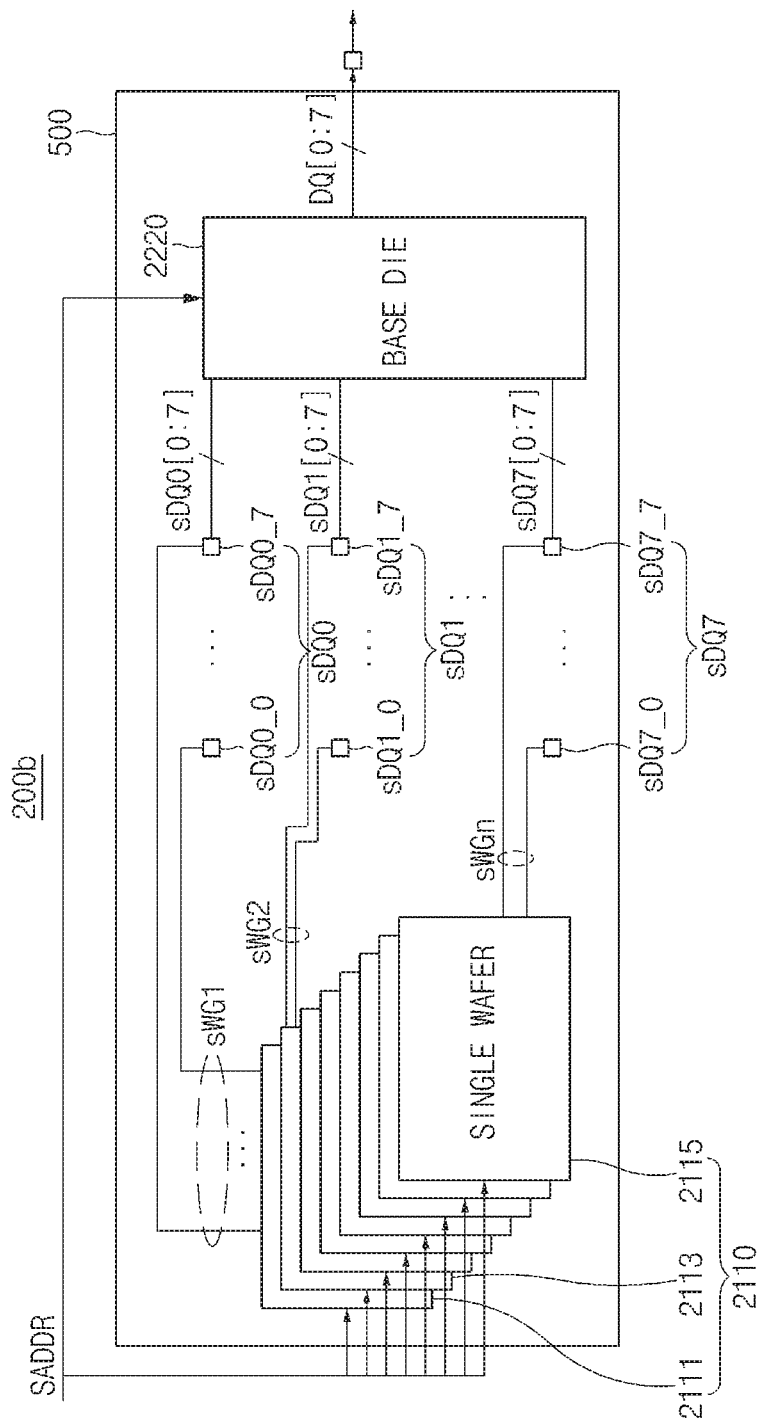

FIG. 5 is a diagram illustrating a representation of an example of a memory package included in the memory module according to an embodiment.

Referring to FIG. 5, a memory package 200b may include a plurality of single wafers 2110 that perform an input/output operation with a preset burst length, auxiliary input/output pin sets sDQ0 to sDQn, and a base die 2220.

Each of the single wafers 2111, 2113, and 2115 provided in the memory package 200b may perform an input/output operation with substantially the same burst length. The case in which each of the single wafers 2111, 2113, and 2115 performs an ×8 input/output operation will be described with reference to FIG. 5; however, the embodiments are not limited thereto.

The single wafers 2111, 2113, and 2115 are respectively coupled to the auxiliary input/output pin sets sDQ0 to sDQn through auxiliary wire groups sWG1 to sWGn in a one-to-one manner. The auxiliary input/output pin sets sDQ0 to sDQn may respectively include 8 auxiliary input/output pins sDQ0_0 to sDQ0_7, sDQ1_0 to sDQ1_7, . . . , sDQ7_0 to sDQ7_7 according to a burst length, and each of the auxiliary wire groups sWG1 to sWGn may include 8 auxiliary wires according to the burst length.

For example, the first single wafer 2111 is coupled to the first auxiliary input/output pin set sDQ0 (sDQ0_0 to sDQ0_7) through the first auxiliary wire group sWG1 in a one-to-one manner, and the second single wafer 2113 is coupled to the second auxiliary input/output pin set sDQ1 (sDQ1_0 to sDQ1_7) through the second auxiliary wire group sWG2 in a one-to-one manner. In the same manner, a plurality of single wafers may be coupled to auxiliary input/output pin sets through auxiliary wire groups in a one-to-one manner.

The auxiliary input/output pin sets may have substantially the same number and the number of auxiliary input/output pin sets may correspond to the burst length of the single wafer (i.e., 2111, 2113, or 2115) from the plurality of single wafers 2110.

Since all the auxiliary input/output pins sDQ0_0 to sDQ0_7, sDQ1_0 to sDQ1_7, . . . , sDQ7_0 to sDQ7_7 constituting the auxiliary input/output pin sets sDQ0 to sDQ7 of the memory package 200b according to an embodiment are coupled to the single wafer 2110 through one wire, loading when viewed from the auxiliary input/output pins may be reduced.

Each of the auxiliary input/output pin sets sDQ0 to sDQ7 is coupled to the base die 2220, and the base die 2220 couples the auxiliary input/output pin sets sDQ0 to sDQ7 to one input/output pin DQ[0:7] on the basis of a selection signal SADDR.

For example, the base die 2220 selects one of the first to $n^{th}$ auxiliary input/output pin sets sDQ0 to sDQ7 on the basis of the selection signal SADDR, and couples the selected auxiliary input/output pin set to the input/output pin DQ[0:7]. For example, the base die 2220 may couple the second auxiliary input/output pin set sDQ1 (sDQ1_0 to sDQ1_7) to the input/output pin DQ[0:7].

In the memory package 200b according to an embodiment, the burst length of each single wafer 2110 is substantially equal to that of the entire memory package 200b. Accordingly, one of the plurality of single wafers 2110 is activated on the basis of the selection signal SADDR, and data of the activated single wafer is provided to the base die 2220 through an auxiliary input/output pin set. The base die 2220 couples the auxiliary input/output pin set of the single wafer activated on the basis of the selection signal SADDR to the input/output pin DQ[0:7] of the memory package 200b, or provides the input/output pin DQ[0:7] with data provided through the auxiliary input/output pin set of the activated single wafer.

In an embodiment, the base die 2220 may provide data provided through the input/output pin DQ[0:7] to an auxiliary input/output pin set specified on the basis of the selection signal SADDR, and the provided data may be provided to the single wafer activated on the basis of the selection signal SADDR.

The number (8 in FIG. 5) of pins included in each auxiliary input/output pin set is substantially equal to the number of input/output pins of the memory package 200b. Accordingly, only one auxiliary wire may be coupled to one auxiliary input/output pin.

The memory package according to an embodiment includes auxiliary input/output pins coupled to a plurality of single wafers in a one-to-one manner, thereby minimizing loading when viewed from the auxiliary input/output pins and selectively activating the single wafers, so that operations of the single wafers are possible by utilizing input/output pins provided to the memory package.

According to an embodiment, the selection signal SADDR may be provided from the control circuits 300 of the memory modules 1a to 1c illustrated in FIG. 1 to FIG. 3 or may also be provided from a control unit (not illustrated) provided in the memory package 200b.

As described above, the memory modules 1a to 1c according to embodiments may activate some of an entire memory group to have substantially the same burst length as the input/output buses of the memory modules 1a to 1c. Consequently, as compared with the case in which an entire memory group of the memory modules 1a to 1c operates, low power consumption can be controlled. Furthermore, the memory packages 200a and 200b included in the memory modules 1a to 1c are coupled to single wafers so as to correspond to input/output pins in a one-to-one manner, so that loading when viewed from the input/output pins can be minimized.

While various embodiments have been described above, it will be understood to those skilled in the art that the embodiments described are by way of example only. Accordingly, the memory module described herein should not be limited based on the described embodiments.

Figure 6:
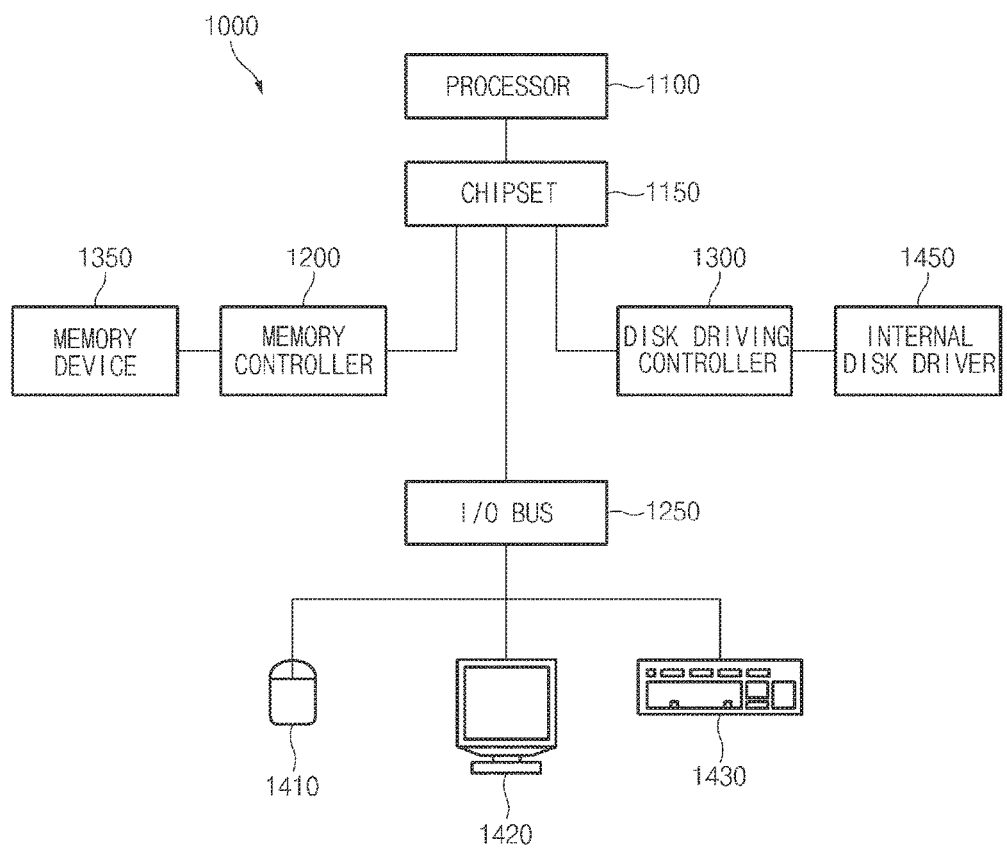
FIG. 6 illustrates a block diagram of an example of a representation of a system employing a memory module with the various embodiments discussed above with relation to FIGS. 1-5.

The memory modules as discussed above (see FIGS. 1-5) are particular useful in the design of memory devices, processors, and computer systems. For example, referring to FIG. 6, a block diagram of a system employing a memory module in accordance with the various embodiments are illustrated and generally designated by a reference numeral 1000. The system 1000 may include one or more processors (i.e., Processor) or, for example but not limited to, central processing units ("CPUs") 1100. The processor (i.e., CPU) 1100 may be used individually or in combination with other processors (i.e., CPUs). While the processor (i.e., CPU) 1100 will be referred to primarily in the singular, it will be understood by those skilled in the art that a system 1000 with any number of physical or logical processors (i.e., CPUs) may be implemented.

A chipset 1150 may be operably coupled to the processor (i.e., CPU) 1100. The chipset 1150 is a communication pathway for signals between the processor (i.e., CPU) 1100 and other components of the system 1000. Other components of the system 1000 may include a memory controller 1200, an input/output ("I/O") bus 1250, and a disk driving controller 1300. Depending on the configuration of the system 1000, any one of a number of different signals may be transmitted through the chipset 1150, and those skilled in the art will appreciate that the routing of the signals throughout the system 1000 can be readily adjusted without changing the underlying nature of the system 1000.

As stated above, the memory controller 1200 may be operably coupled to the chipset 1150. The memory controller 1200 may include at least one memory module as discussed above with reference to FIGS. 1-5. Thus, the memory controller 1200 can receive a request provided from the processor (i.e., CPU) 1100, through the chipset 1150. In alternate embodiments, the memory controller 1200 may be integrated into the chipset 1150. The memory controller 1200 may be operably coupled to one or more memory devices 1350. In an embodiment, the memory devices 1350 may include the at least one memory module as discussed above with relation to FIGS. 1-5, the memory devices 1350 may include a plurality of word lines and a plurality of bit lines for defining a plurality of memory cells. The memory devices 1350 may be any one of a number of industry standard memory types, including but not limited to, single inline memory modules ("SIMMs") and dual inline memory modules ("DIMMs"). Further, the memory devices 1350 may facilitate the safe removal of the external data storage devices by storing both instructions and data.

The chipset 1150 may also be coupled to the I/O bus 1250. The I/O bus 1250 may serve as a communication pathway for signals from the chipset 1150 to I/O devices 1410, 1420, and 1430. The I/O devices 1410, 1420, and 1430 may include, for example but are not limited to, a mouse 1410, a video display 1420, or a keyboard 1430. The I/O bus 1250 may employ any one of a number of communications protocols to communicate with the I/O devices 1410, 1420, and 1430. In an embodiment, the I/O bus 1250 may be integrated into the chipset 1150.

The disk driving controller 1300 may be operably coupled to the chipset 1150. The disk driving controller 1300 may serve as the communication pathway between the chipset 1150 and one internal disk driver 1450 or more than one internal disk driver 1450. The internal disk driver 1450 may facilitate disconnection of the external data storage devices by storing both instructions and data. The disk driving controller 1300 and the internal disk driver 1450 may communicate with each other or with the chipset 1150 using virtually any type of communication protocol, including, for example but not limited to, all of those mentioned above with regard to the I/O bus 1250.

It is important to note that the system 1000 described above in relation to FIG. 6 is merely one example of a system 1000 employing a memory module as discussed above with relation to FIGS. 1-5. In alternate embodiments, such as, for example but not limited to, cellular phones or digital cameras, the components may differ from the embodiments illustrated in FIG. 6.

The embodiments of the present disclosure have been disclosed above for illustrative purposes. Those of ordinary skill in the art will appreciate that various modifications, additions, and substitutions are possible, without departing from the scope and spirit of the present disclosure as disclosed in the accompanying claims.

What is claimed is:

1. A memory module comprising:
   a plurality of memory groups configured to include a plurality of memory packages, and input/output data;
   a control circuit configured to activate one or more of the plurality of memory groups on a basis of an address signal; and
   a multiplexer circuit configured to couple the memory group activated on the basis of the address signal to input/output buses of the memory module,
   wherein each of the memory package comprises:
   a plurality of single wafers each of which configured to perform an input/output operation with a first burst length; and
   a plurality of input/output pins configured to be coupled to the plurality of single wafers in a one-to-one manner.

2. The memory module of claim 1, wherein the control circuit controls activation of the memory groups on the basis of the address signal such that a number of the input/output buses of the memory module is substantially equal to a number of the input/output pins of the activated memory group.

3. The memory module of claim 2, wherein the plurality of memory groups are mounted on substantially a same plane of a substrate.

4. The memory module of claim 2, wherein each of the memory package comprises
   a plurality of wires configured to couple the plurality of single wafers to the plurality of input/output pins.

5. The memory module of claim 4, wherein the memory package performs an input/output operation with a second burst length, which corresponds to a value obtained by multiplying the first burst length by a number of the plurality of single wafers, through the plurality of input/output pins.

6. The memory module of claim 4, wherein the plurality of single wafers are sequentially stacked.

7. A memory module comprising:
   a plurality of memory groups configured to include a plurality of memory packages, and input/output data;
   a control circuit configured to activate one or more of the plurality of memory groups on a basis of an address signal; and
   a multiplexer circuit configured to couple the memory group activated on the basis of the address signal to input/output buses of the memory module,
   wherein each of the memory package comprises:
   a plurality of single wafers each of which is configured to perform an input/output operation with a preset burst length;
   a plurality of auxiliary input/output pin sets configured to be coupled to the plurality of single wafers in a one-to-one manner, wherein a number of auxiliary input/output pins included by each auxiliary input/output pin set corresponds to the preset burst length; and
   a base die configured to couple one of the auxiliary input/output pin sets to input/output pins on a basis of a selection signal.

8. The memory module of claim 7, wherein the memory package performs an input/output operation with the preset burst length.

9. The memory module of claim 8, wherein the plurality of single wafers are activated on the basis of the selection signal and perform an input/output operation.

10. The memory module of claim 8, wherein a number of pins of the one auxiliary input/output pin set is substantially equal to a number of the input/output pins.

11. The memory module of claim 7, further comprising:
    auxiliary wires configured to couple the auxiliary input/output pin sets to the plurality of single wafers in a one-to-one manner.

12. The memory module of claim 1, wherein each of the memory groups includes the same number of memory packages.

13. The memory module of claim 1, wherein each of the memory groups includes the same number of the input/output pins.

14. The memory module of claim 1, wherein when the memory groups are activated, the data bit numbers inputted and outputted for predetermined time intervals are substantially equal to each other.

15. The memory module of claim 1, wherein burst lengths associated with each memory group are substantially equal to each other.

16. The memory module of claim 1, wherein the plurality of memory group comprises:
   a first memory group configured to include a plurality of memory packages, and input/output data through input/output pins;
   a second memory group configured to include a plurality of memory packages, and input/output data through input/output pins;
   a third memory group configured to include a plurality of memory packages, and input/output data through input/output pins; and
   a fourth memory group configured to include a plurality of memory packages, and input/output data through input/output pins,
   wherein the control circuit is configured to activate one or more of the first, second, third, and fourth memory groups on a basis of the address signal, and
   wherein the multiplexer circuit comprises:
   a first multiplexer circuit configured to couple the first and second memory groups activated on the basis of the address signal to input/output buses of the memory module; and
   a second multiplexer circuit configured to couple the third and fourth memory groups activated on the basis of the address signal to input/output buses of the memory module.

17. The memory module of claim 7, wherein the plurality of memory group comprises:
   a first memory group configured to include a plurality of memory packages, and input/output data through input/output pins;
   a second memory group configured to include a plurality of memory packages, and input/output data through input/output pins;
   a third memory group configured to include a plurality of memory packages, and input/output data through input/output pins; and
   a fourth memory group configured to include a plurality of memory packages, and input/output data through input/output pins,
   wherein the control circuit is configured to activate one or more of the first, second, third, and fourth memory groups on a basis of the address signal, and
   wherein the multiplexer circuit comprises:
   a first multiplexer circuit configured to couple the first and second memory groups activated on the basis of the address signal to input/output buses of the memory module; and
   a second multiplexer circuit configured to couple the third and fourth memory groups activated on the basis of the address signal to input/output buses of the memory module.

18. The memory module of claim 17,
   wherein the first and second memory groups are coupled to the first multiplexer circuit through interconnections having substantially the same length, and
   wherein the third and fourth memory groups are coupled to the second multiplexer circuit through interconnections having substantially the same length.

19. The memory module of claim 17, wherein each of the memory groups includes the same number of memory packages.

20. The memory module of claim 17, wherein burst lengths associated with each memory group are substantially equal to each other.

* * * * *